Nov. 5, 1935.  A. G. LEAKE  2,019,684
STRUCTURAL STEEL CONNECTION
Filed Dec. 17, 1932  2 Sheets-Sheet 1
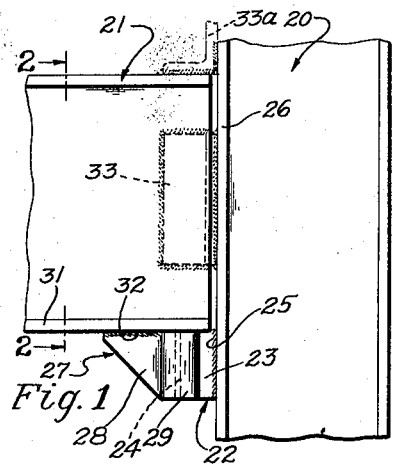
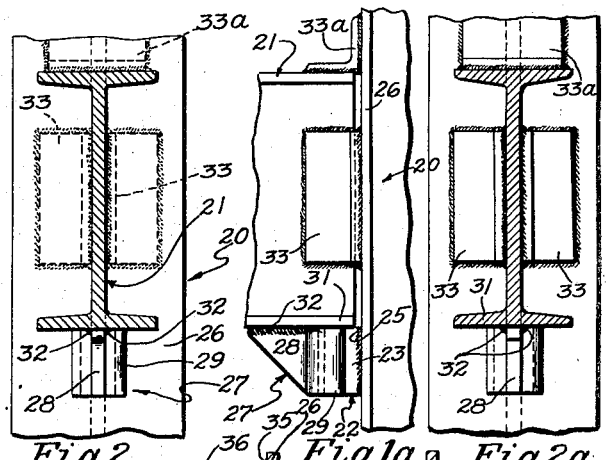
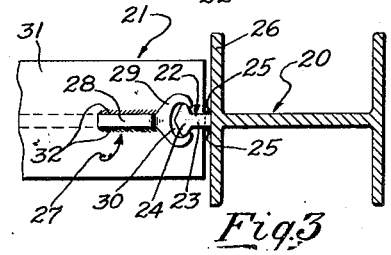
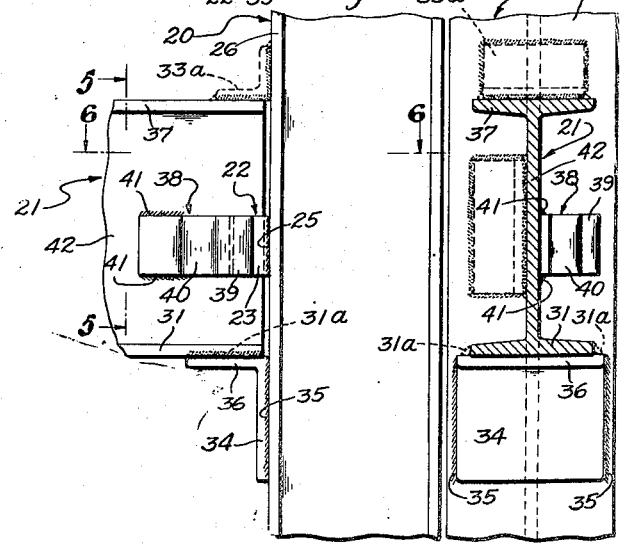
Inventor
Arthur G. Leake
By Wooster & Davis
Attorneys

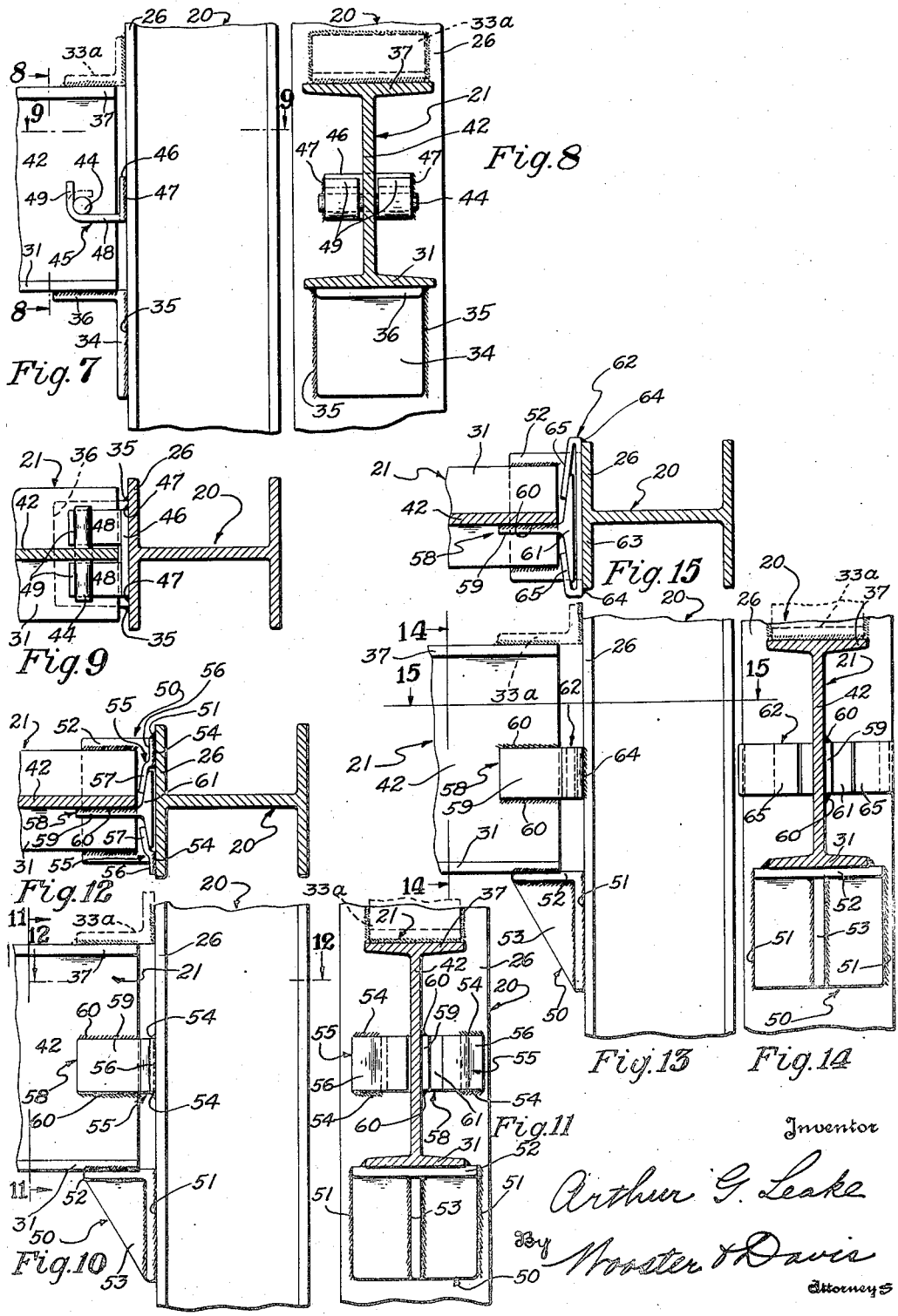

Patented Nov. 5, 1935

2,019,684

UNITED STATES PATENT OFFICE 2,019,684

STRUCTURAL STEEL CONNECTION

Arthur G. Leake, Bridgeport, Conn.

Application December 17, 1932, Serial No. 647,754

6 Claims. (Cl. 189—36)

This invention relates to new and useful improvements in structural steel connections.

An object of the invention is to provide a method and means whereby the ends of beams may be easily and quickly connected to columns or other supports, in position for welding thereto in assembling steel building structures without the use of rivets, bolts or the like, and without the necessity of punching or drilling holes in the beams or columns.

Another object is to provide a simple and inexpensive means for the purpose specified, and which means will support the beams on the columns or similar supports and hold the beams in proper position for the final welding of the beams to the columns or similar supports.

A further object is to provide a means as stated and which includes means carried by the columns or other supporting members and means carried by the beams and which may be applied to said structural elements either at the mill or shop or in the field, and which means are adapted to be interengaged or interlocked by vertical movement of the beams relative to the columns.

In the specification and claims I have used the term column in a generic sense as meaning the support for the beam.

Other objects and advantages will become apparent from a consideration of the following detailed description taken in connection with the accompanying drawings wherein satisfactory embodiments of the invention are shown. However, it will be understood that the invention is not limited to the details disclosed but includes all such modifications and variations as fall within the spirit of the invention and the scope of the appended claims.

In the drawings:

Fig. 1 is a side elevational view showing a portion of a column and a portion of a beam connected in accordance with the present invention;

Fig. 2 is a sectional view taken substantially along the line 2—2 of Fig. 1;

Figs. 1a and 2a are views similar to Figs. 1 and 2 showing the final connection completed;

Fig. 3 is a bottom plan view of Fig. 1, but showing the column in section;

Fig. 4 is a view similar to Fig. 1 but showing a slightly modified arrangement;

Fig. 5 is a sectional view taken substantially along the line 5—5 of Fig. 4;

Fig. 6 is a sectional view taken substantially along the line 6—6 of Fig. 4;

Fig. 7 is a view similar to Fig. 1 but showing a further slightly modified construction;

Fig. 8 is a sectional view taken substantially along the line 8—8 of Fig. 7;

Fig. 9 is a sectional view taken substantially along the line 9—9 of Fig. 7;

Fig. 10 is a view similar to Fig. 1 but showing yet another slightly modified arrangement;

Fig. 11 is a sectional view taken substantially along the line 11—11 of Fig. 10;

Fig. 12 is a sectional view taken substantially along the line 12—12 of Fig. 10;

Fig. 13 is a view similar to Fig. 1 and showing a further slight modification;

Fig. 14 is a sectional view taken substantially along the line 14—14 of Fig. 13; and Fig. 15 is a sectional view taken substantially along the line 15—15 of Fig. 13.

Referring in detail to the drawings, and at first particularly to Figs. 1, 2 and 3, at 20 is shown a portion of a column, and at 21 is shown an end portion of a beam to be welded to said column. At the present time in the erection of structural steel frame works and the like, it is the practice to position and plumb or line up the members by temporarily securing the end portions of beams to columns by bolting or riveting connecting members to the beams and columns. This makes a temporary connection as the beams and columns are ultimately to be welded together, and after the welding operations the temporary connections may be permitted to remain in place or may be removed. However, the only function of these temporary connections is to maintain the beams properly positioned with respect to the columns so that these structural elements may be connected by welding.

As the present practice requires the punching or drilling of bolt or rivet holes in the beams and columns it will be appreciated that the structural elements are somewhat weakened. Further, the operation is expensive and as the suppliers of the materials work to rather large tolerances it may frequently happen that bolt or rivet openings formed at the shop or mill will be found to be improperly positioned with the result that other or additional openings must be provided during the fabricating or erecting of a building or other structure. The present invention provides a means and method whereby beams may be connected with columns and supported in proper position relative thereto without any punching or drilling or setting of rivets or bolts, and whereby the final welding together of the beams and columns may be proceeded with without difficulty or delay.

A connecting means or member 22 is provided and this member includes a web portion 23 and an enlarged portion at one edge of the web portion and forming a head 24. The other edge portion of the web 23 is welded as at 25 to a flange 26 of the column 20 which column is here disclosed as being H or I-shaped in cross section but it may be of any shape or section desired. Connecting member 22 is disposed vertical or parallel with relation to the column 20 and extends outwardly or laterally with respect to the same whereby the head 24 of said member is arranged in spaced relation to the flange 26 of the column.

A second connecting means or member 27 is provided and includes a shank portion 28 and a head 29, the latter having a channel 30 therethrough. The upper edge of the shank portion 28 of this second connecting means is welded to the under surface of the lower flange 31 of the beam 21 as at 32 and is so disposed with relation to the beam that its entire shank portion and its head 29 are disposed inwardly of the extreme end of the beam the proper distance to properly locate the end of the beam in relation to the column. It will be evident this can be accurately determined from the plans and by measurement of the beam so that when the beam is placed in position as described below it will be accurately located by the mere act of making the connection. It will also be noted that the channel 30 opens through the front or forward side of the head 29 and that when the member 27 is secured in place on the beam one end of this channel will be closed by the beam.

When the respective connecting means or members are secured to the column and beam as above described, the beam may be easily and quickly attached to or assembled on the column simply by lowering the beam relative to the column so as to have the channel 30 in the head of the connecting member 27 receive the head 24 of the connecting member 22 as best shown in Fig. 3. This will permit the lower surface of the end portion of the beam to rest on the top or upper end of member 22 whereby the beam end will be supported against downward movement. As the head 24 of member 22 is received in the channel 30 of the head 29 of member 27 the members will be interlocked or interengaged and the beam will be held against movement outwardly or away from the column. This interlocking is due to the fact that while the head 29 is open at its forward side this opening is of less width than the width of the head 24 and is to accommodate the web portion 23 of the means 22. Therefore the members may only be attached or detached by a relative movement longitudinally with respect to their heads. As stated above as the member 27 can be accurately positioned, as soon as this connection is made the beam is accurately positioned with respect to the column or other support.

When the beam is secured to the column as above described, the parts are properly positioned for the final welding which may be done immediately or when convenient or as is practical. All relative movement between the beam and column is prevented with the exception of a vertical movement of the beam relative to the column, and this, of course, will be prevented by the weight of the beam. The final welding involves the welding of angle brackets or other brackets 33 and 33a to the beam and to the column as suggested in the drawings. These brackets 33 and 33a are shown in dotted lines in Figs. 1 and 2 for the purpose of clarity in the drawings, but the completed connection is shown in full lines in Figs. 1a and 2a, and it will be apparent that they may first be welded to the beam and then to the column or vice versa. The connecting members 23 and 27 may be permitted to remain in place since they provide a strong and firm connection between the beam and column. Whether both angles or brackets 33 and 33a will be used will depend on whether the desired strength of the connection requires the use of one or both. In some connections it may require the use of only one angle 33 or of angle 33a only.

In Figs. 4, 5 and 6, the reference characters heretofore employed are used where they apply. In these figures the lower flange 31 of the beam 21 rests on the arm 36 of support 34 which support is welded to the column at 35. The support 34 takes care of the weight of the end portion of beam 21 and the support is arranged to maintain the beam at the desired elevation on the column 20. A connecting member 22 has one edge of its web portion 23 welded to the flange 26 of column 20 as at 25. The head 24 of the connecting member, being at the other edge of the web 23, is disposed outwardly with respect to the column and particularly by reference to Fig. 6 it will be noted that according to the modification now being described the connecting member 22 is substantially offset from the longitudinal center line of the flange 26 of the column.

A connecting member 38 is provided and the same includes a head 39 and a stem or web 40 offset as best shown in Figure 6. The end portion of this web 40 remote from the head 39 is welded as at 41 to the web 42 of the beam. Head 39 has a channel 43 therethrough which channel receives the head 24 of the connecting member 22 as will be understood. At its forward side the head 39 is open or slotted to accommodate the web or shank 23 of the connecting member 22 and the head 24 is disposed in the channel 43 by a vertical movement of the beam relative to the column.

In assembling the beam on the column the beam would be moved laterally to dispose its web portion 31 below the attaching means or member 22 and to dispose the head 39 of connecting member 38 in alignment with the head 24 of connecting member 22. The beam would then be lowered to have the connecting members interlock or interengage and to dispose the lower surface of the end portion of the beam on the support 34. After the beam is assembled on the column as described above, brackets 33 may be welded to the beam and column and the lower flange 31 of the beam may be welded to the arm 36 of the support 34 as indicated at 31a.

Referring now to Figs. 7 through 9, the support 34 has one arm welded to the column at 35 and the end of beam 21 rests on the outwardly extending arm 36 of said support. Extending through the web 42 of the beam so as to project at opposite sides of said web is a pin 44. This pin forms a connecting member or means, and a complemental or second connecting member or means is shown at 45 and includes a plate-like portion 46 welded to the flange 26 of the column as at 47. Means 45 includes a portion disposed substantially at right angles to its plate-like portion 46 and this second portion is split or bifurcated providing a pair of arms 48 having their outer ends upturned as at 49.

The space between the arms 48 is of sufficient width to receive the web of the beam, and when the parts are assembled the web enters between these arms and the upturned portions 49 of the arms are disposed in the rear of the projecting ends of the pin 44 and the portions 49 of the arms may then be bent over as suggested by the broken lines in Fig. 7. The member 48 is welded to the column above the support 34 and the relationship is such that when the beam rests on the arm 36 of the support the arms 48 of attaching member 45 are disposed just below or against the under sides of the extending end portions of pin 44. After the parts are attached or connected as described the final welding together of the beam and column may be accomplished by welding the angle brackets 33 to the beam and column. Also, the arm 36 of support 34 may be welded to the flange 31 of the beam. In this assembly the weight of the end of the beam is taken care of by the support 34 and the beam is prevented from moving away from the column owing to the connection between the member or pin 44 and the member or means 45.

According to Figures 10, 11 and 12, a support 50 has an arm welded at 51 to the outer surface of the flange 26 of the column, and this support includes an arm 52 extending at right angles to the column and having the end portion of the beam 21 resting thereon. While the support 50 performs the function of the support 34 of the figures previously described, it is of a slightly different construction and includes a web portion 53 welded or otherwise secured in place and arranged to brace or strengthen the outwardly extending arm 52. If desired, the support 34 of the other figures may be provided with this or a similar strengthening rib or web.

Welded to the column above the support 50 as at 54 are a pair of members 55 each including a relatively flat portion 56 welded to the column and an inclined portion 57 carried by the portion 56. These inclined portions 57 incline toward one another whereby with the flange 26 of the column a channel is provided. A connecting member or means 58 is provided and includes a shank 59 welded to the web 42 of the beam as at 60. This member 58 also includes a head 61 or transverse flange carried by the shank portion 59 at one of its ends and the member is so arranged on the beam that said head 61 is disposed beyond the end of the beam. The dimensions of the head are such that the head is adapted to be received in the channel formed between the flange 26 of the column and the portions 57 of the members 55. This member may be cut to proper length from a rolled T-bar section.

In connecting the beam with the column the end portion of the beam is lowered relative to the column and is guided so that the head 61 enters the channel above referred to. The ends of the portions 57 of the attaching or connecting member 55 are spaced apart whereby to accommodate the web or shank 59 of member 58, and when the beam rests on the arm 52 of the support the head 61 will be beneath or at the rear of portions 57 of the column carried connecting members. The weight of the end portion of the beam is carried by the support 50 and movement of the beam away from the column is prevented by the interengaging or interlocking of the member 58 with the members 55. The operation of connecting the beam with the column is then completed by welding the brackets 33 to the beam and the column, and during this process the bottom flange 31 of the beam may be welded to the arm 52 of the support.

In Figs. 13, 14 and 15, the support 50 is shown welded to the column at 51, and one end portion of the beam 21 rests on the upper arm 52 of the support. The connecting member or means 58 is welded to the web 42 of the beam at 60 and has its head 61 disposed beyond the end of the beam as most clearly shown in Fig. 15. A complemental connecting member or means 62 is provided and includes a connecting portion or body 63 welded at 64 to the flange 26 of the column. This member 62 includes arms 65 inclining outwardly and toward one another and having their ends spaced apart. The member 62 is a channel member and receives the head 61 of the member 58, the space between the ends of the arms 65 being more than sufficient to accommodate the web or shank 59 of the member 58.

It will be noted that the member 58 is so positioned on the beam and the member 62 is so positioned on the column, that when the beam rests on the support 50 the head 61 of member 58 is received in the channel formed by the member 62. This interlocking or interengaging of the members 58 and 62 serves to prevent movement of the beam relative to the column, and serves to maintain the beam so positioned that its end rests on the support 50. In this position of the parts, the brackets 33 may be welded in place to the beams and columns, and the lower flange of the beam may be welded to the upper arm of the support 50.

From the foregoing description, it will be seen that I have provided a means and method whereby a structural member, as a beam, may have one of its ends easily and quickly connected with a second structural member, as a column, whereby the structural members will be properly and accurately positioned to be connected by welding. The connecting or attaching members or means of the several figures of the drawings are so constructed that it is but necessary to lower the beam into place to cause the members to interlock or interengage and connect the beam and column in proper relative positions. Further, it will be noted that the means is of simple construction whereby it may be manufactured at low cost, and is such that it may form part of the permanent connection between the beam and column or other structural parts or elements, and that it may be applied without punching or drilling holes in the elements to be connected. As the connecting members 27, 38, 44, and 59 can be connected to the beam at any position, it can be easily positioned or properly spaced from the end of the beam to take care of variations in the lengths of the beams due to the tolerances required by the manufacturer. The final welded connections also allow for these variations as it is not necessary that the end of the beam be accurately positioned with respect to the column. This does away with the necessity of cutting or sawing off the end portion of a beam or trouble due to inaccurate locating of rivet or bolt holes often met with in the old methods or connections.

Having thus set forth the nature of my invention, what I claim is:

1. In a welded building structure, a column, an upright supporting member having one edge welded to a side of the column and projecting outwardly therefrom, said member having an upright head at its free edge, a beam of greater width than its body portion, an upright connecting member welded at its top edge to the under side of the beam so as to extend downwardly therefrom, and said connecting member having an upright channel to receive said head and overhanging sides to engage behind the head to prevent lateral separation of the beam and column while permitting free vertical movement of the beam to allow it to rest directly on the top of the supporting member to be supported thereby, and an additional bracket welded to the column and the beam above the first members to permanently secure the beam and column together.

2. In a welded building structure, a column, a beam, coacting means on the column and beam to secure the beam against lateral movement away from the column comprising a member on the column extending laterally thereof, another member welded to the beam adjacent one of its ends, one of said members including an enlarged vertically extending portion forming a head of greater width than its body portion, the other member having a vertically extending channel open at both ends receiving said head and a narrower slot opening through one side of the channel for the said body portion whereby an interlocking connection is formed between said members, additional means for permanently securing the beam and column together comprising a bracket welded to the beam and the column, and one of said means providing a support extending laterally from the column on which the beam rests and by which it is supported.

3. In a welded building structure, a column member, a beam member, cooperating means on the column and beam members including means on one of said members forming an upright channel with a narrower slot opening through one side, a connecting member having a shank welded on the other of said first mentioned members and including a head and a narrower shank, said connecting member being positioned with its head in the channel and its shank projecting through the slot to secure the beam against lateral movement relative to the column, means for permanently securing the beam and column together comprising a bracket welded to the beam and to the column, and one of said means comprising a support projecting laterally from the column on which the beam rests and by which it is supported.

4. In combination, a column, a beam, a support carried by said column and extending laterally thereof, said beam at one end resting directly on said support, means on said column and extending laterally thereof above said support, means on said beam adjacent one of its ends, one of said means including an enlarged portion forming an upright head of greater width than its body portion, the other of said means having a channel open at both ends receiving said head and a narrower slot opening through one side of the channel to receive the body portion whereby said means interlock, and said interlocking connection between said means serving to secure the beam against movement away from the column.

5. In combination, a column, a beam, a support carried by said column and extending laterally thereof, means on said column and extending laterally thereof above said support, means on one side of said beam adjacent one of its ends, one of said means including an enlarged vertically extending portion forming a head of greater width than its body portion, the other of said means having a vertically extending channel open at both ends receiving said head and a narrower slot opening through one side of the channel for the said body portion whereby an interlocking connection is formed between said means, said beam adjacent one end resting on and supported by said support, and said interlocking connection between said means serving to secure the beam against movement away from the column.

6. In combination, a column, a beam, a support carried by said column and extending laterally thereof, means on said column above said support and cooperating with the column to form a channel with a narrower slot opening through one side, a connecting member including a head and a narrower shank, said connecting member having its shank secured to the web of the beam with its head disposed beyond the end of the beam and in said channel with the shank extending through the slot, said beam adjacent one end resting on and supported by said support, and said connecting member and means on the column cooperating to secure the beam against movement relative to the column.

ARTHUR G. LEAKE.